United States Patent
Trabelsi

(10) Patent No.: US 10,003,578 B2
(45) Date of Patent: Jun. 19, 2018

(54) ANONYMOUS SHARING OF MICROBLOG PUBLICATION

(71) Applicant: SAP SE, Walldorf (DE)

(72) Inventor: Slim Trabelsi, Biot (FR)

(73) Assignee: SAP SE, Walldorf (DE)

( * ) Notice: Subject to any disclaimer, the term of this patent is extended or adjusted under 35 U.S.C. 154(b) by 107 days.

(21) Appl. No.: 15/340,781

(22) Filed: Nov. 1, 2016

(65) Prior Publication Data

US 2018/0124022 A1     May 3, 2018

(51) Int. Cl.
| | |
|---|---|
| H04L 29/06 | (2006.01) |
| G06F 21/60 | (2013.01) |
| H04L 9/32 | (2006.01) |
| H04K 1/00 | (2006.01) |
| G06F 7/04 | (2006.01) |
| G06F 17/30 | (2006.01) |
| H04N 7/16 | (2011.01) |

(52) U.S. Cl.
CPC ........ *H04L 63/0421* (2013.01); *G06F 21/602* (2013.01); *G06F 21/606* (2013.01); *H04L 63/0471* (2013.01); *H04L 2209/42* (2013.01)

(58) Field of Classification Search
None
See application file for complete search history.

(56) References Cited

U.S. PATENT DOCUMENTS

| | | | | |
|---|---|---|---|---|
| 4,802,220 A | * | 1/1989 | Marker, Jr. | H04L 9/00 380/257 |
| 6,745,231 B1 | * | 6/2004 | Megiddo | H04L 63/18 380/255 |
| 2004/0025018 A1 | * | 2/2004 | Haas | H04L 45/26 713/168 |

(Continued)

OTHER PUBLICATIONS

Jorg Daubert et al, "Twitterize: Anonymous Micro-Blogging", International Conference on Computer Systems and Applications (AICCSA), Nov. 2014, pp. 817-823.

(Continued)

*Primary Examiner* — Eric Chen
(74) *Attorney, Agent, or Firm* — Fountainhead Law Group P.C.

(57) ABSTRACT

Anonymity and confidentiality of information published from a microblogging platform, are preserved using randomly chosen relays (not related to the publisher account) in order to hide content in the cloud of published messages. The information can be relayed in clear text or in encrypted format. Additional linked relays may be used to overcome character number limitations imposed by the microblogging platform, with the longer full text of the original message reconstructed at the conclusion of the process. Depending upon the desired degree of confidentiality, complexity of the relay combination can be adjusted, and the path secretly shared among sender and authorized recipient. Only authorized recipient(s) can obtain (through another platform) the path combination to reach the message. A trusted third party (Continued)

stores the path relays and authorizations to access the path. The confidential information that is to be shared, may remain on the microblogging platform spread randomly over anonymous accounts.

18 Claims, 6 Drawing Sheets

(56) References Cited

U.S. PATENT DOCUMENTS

| | | | | |
|---|---|---|---|---|
| 2013/0177157 | A1* | 7/2013 | Li | H04L 9/083 380/277 |
| 2014/0280652 | A1* | 9/2014 | Yang | H04L 51/046 709/206 |
| 2015/0371015 | A1* | 12/2015 | Garcia Manchado | H04L 63/04 726/30 |
| 2015/0379303 | A1* | 12/2015 | LaFever | G06F 21/6218 726/28 |

OTHER PUBLICATIONS

Emiliano De Cristofaro, "Tweeting with Hummingbird: Privacy in Large-Scale Micro-Blogging OSNs," Bulletin of the IEEE Computer Society Technical Committee on Data Engineering, vol. 35, No. 4, pp. 93-100, 2012.
Miguel Freitas, "Twister: The Development of a Peer-to-Peer Microblogging Platform", Twister, Sep. 2014, 15 ppgs.

* cited by examiner

ANONYMOUS SHARING OF MICROBLOG PUBLICATION

BACKGROUND

Unless otherwise indicated herein, the approaches described in this section are not prior art to the claims in this application and are not admitted to be prior art by inclusion in this section.

Microblogging platforms (e.g., TWITTER) are designed to allow users to share information to the public, or alternatively to share information restricted to a particular audience. In the case of private publication, only accepted contacts (e.g., followers) can access the publications shared by a user using a private account.

In cases of both public and private dissemination of microblog information, the content of the information shared by the user is not strictly confidential. This is especially true if the trust zone does not contain the microblogging platform itself.

One possible option to ensure confidentiality is to encrypt the shared information. However, encrypted text is usually quite long and cannot be published when the microblogging platform imposes size restrictions for the published text. For example, a TWITTER message is strictly limited to 140 characters or fewer.

Moreover, tracking the activity of a user is easy especially if the user has a single identifiable account. Currently, there is no known way to conceal or render anonymous, part or whole of a publication from a microblogging platform.

SUMMARY

Embodiments preserve anonymity and confidentiality of publications from a microblogging platform. This is accomplished using randomly chosen relays (not related to the publisher account) in order to hide the content in the cloud of published messages. This information can be relayed in clear text or in encrypted format with no character limitation. To overcome any per-message limitation in a number of characters imposed by a particular microblogging platform, the message may be fractionated into separate pieces sent by additional multiple linked relays, with the long encrypted text reconstructed at the end of the process. According to the degree of confidentiality that is desired, the complexity of the relay combination can be adjusted and the path secretly shared among the sender and the authorized recipient. Only the authorized recipient can obtain (through a third party platform) the path combination mapped according to a digest, in order to reach the message.

A trusted third party stores the path relays and the authorizations to access the path. The confidential information that is to be shared may not be stored in the third party server. Rather, it remains on the microblogging platform spread randomly over anonymous accounts.

An embodiment of a computer-implemented method comprises receiving from a first user account of a microblogging platform, an original message addressed to a second user account of the microblogging platform, the original message comprising a plurality of elements. A third user account of the microblogging platform is randomly selected. A first element of the original message is published as a first message on the microblogging platform from the third user account to the second user account. A digest identifying the third user account and allowing a receiver to reconstruct the original message with the first element from the second user account, is communicated outside of the microblogging platform.

A non-transitory computer readable storage medium embodies a computer program for performing a method comprising, receiving from a first user account of a microblogging platform, an original message addressed to a second user account of the microblogging platform. The original message is fractioned into a first element and a second element. A third user account of the microblogging platform is randomly selected. A fourth user account of the microblogging platform is randomly selected. The first element of the original message is published as a first message on the microblogging platform from the third user account to the second user account. The second element of the original message is published as a second message on the microblogging platform from the fourth user account to the second user account. A digest identifying the third user account and the fourth user account and allowing a receiver to reconstruct the original message with the first element and the second element from the second user account, is communicated outside of the microblogging platform.

An embodiment of a computer system comprises one or more processors and a software program, executable on said computer system. The software program is configured to cause an in-memory database engine to receive from a first user account of a microblogging platform, an original message addressed to a second user account of the microblogging platform. The original message comprises a plurality of elements, wherein the first user account and the second user account are stored in the in-memory database. The in-memory database engine randomly selects from the in-memory database, a third user account of the microblogging platform. The in-memory database engine publishes a first element of the original message as a first message on the microblogging platform from the third user account to the second user account. The in-memory database engine stores in the in-memory database, a digest identifying the third user account. The in-memory database engine communicates outside of the microblogging platform, the digest allowing a receiver to reconstruct the original message with the first element from the second user account.

Certain embodiments further comprise fractioning the original message into the first element and a second element, and randomly selecting a fourth user account of the microblogging platform. The second element is published as a second message on the microblogging platform from the fourth user account to the second user account, the digest identifying the fourth user account and allowing the receiver to reconstruct the original message with the second element from the second user account.

In some embodiments the fractioning considers a message length limitation of the microblogging platform.

Particular embodiments further comprise randomly selecting a fourth user account of the microblogging platform, wherein the first element is published to the second user account through the third user account and the fourth user account.

Various embodiments further comprise generating a first identifier of the first message, wherein the digest includes the first identifier.

Some embodiments further comprise storing the digest in a database.

In particular embodiments the third user account is randomly selected from a list of user accounts stored in the database.

According to various embodiments the database comprises an in-memory database.

The following detailed description and accompanying drawings provide a better understanding of the nature and advantages of embodiments.

DETAILED DESCRIPTION

Described herein are methods and apparatuses that implement information sharing for microblogging platforms. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

In order to provide anonymity and confidentiality for microblogging communications, embodiments of information sharing approaches employ a trusted third party decoupled from the microblogging platform. This trusted third party utilizes anonymous and non-personal user accounts selected at random to share fractions of messages, with reconstruction of the final message occurring at the end of the process. In this manner, anonymity and confidentiality of microblogging platform publications can be preserved using a random anonymous chain of user accounts to relay the information, without linking to the original account. Limitations in character number imposed by various microblogging platforms may be overcome by splitting and distributing chunks of data amongst the anonymous relays.

Figure 1:
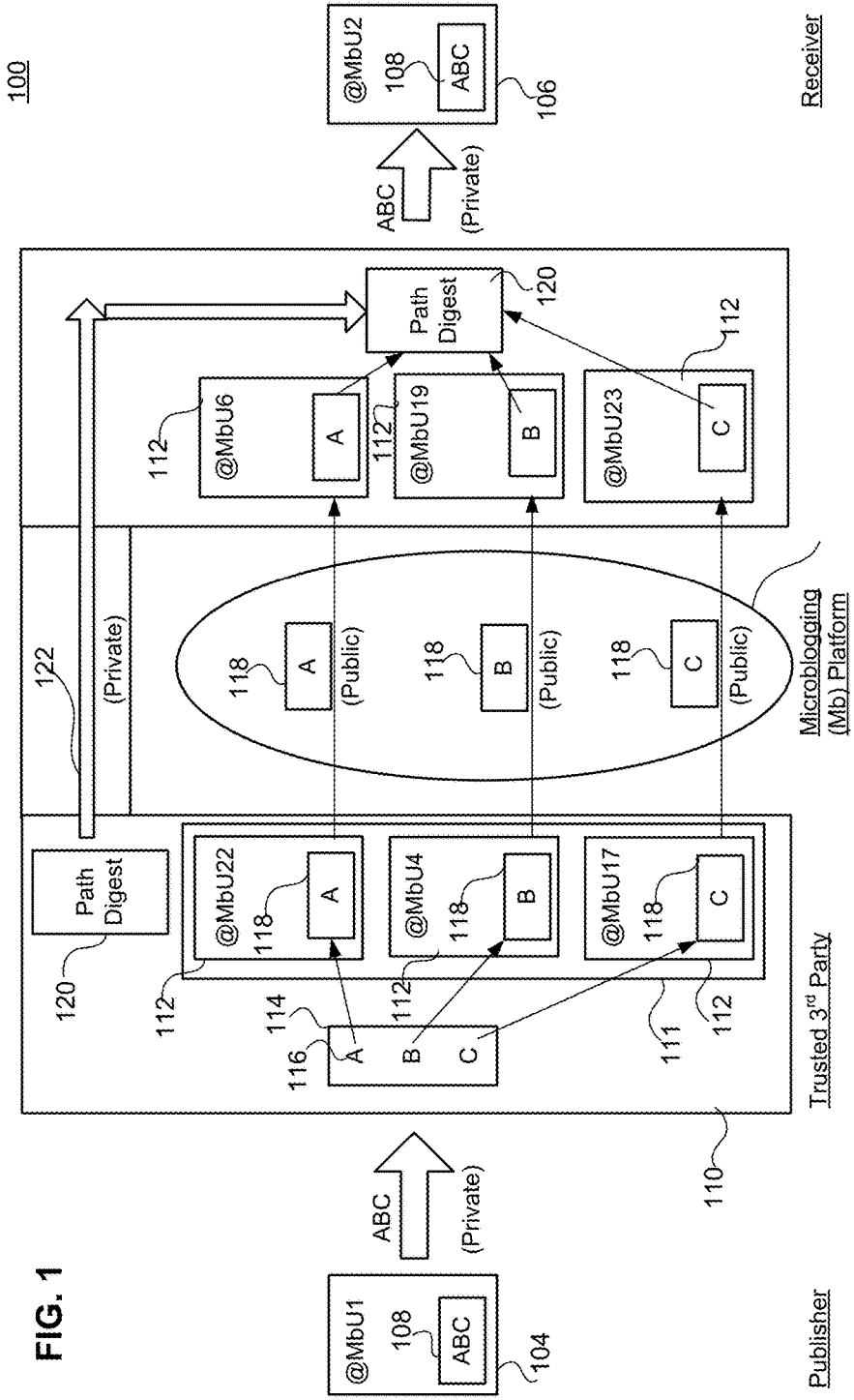
FIG. 1 shows a simplified diagram of a system according to an embodiment.

FIG. 1 shows a simplified view of a system configured to implement cloud database access according to an embodiment. Specifically, system 100 comprises microblogging (Mb) platform 102, including a first microblog user (@MbU1) 104 and a second microblog user (@MbU2) 106.

The first microblog user seeks to publish a message ("ABC") 108 to the second microblog user over the microblogging platform, in an anonymous and confidential manner. In order to accomplish this goal, the first microblog user contacts a trusted third party 110 and communicates the message thereto.

The trusted third party is the owner of a suite of a large number of additional user accounts 112 with the microblogging platform. Here, these additional microblogging accounts are @MbU3-@MbU25. Those additional microblogging accounts serve as dummy accounts to perform the information sharing.

Specifically, upon receipt of the original message from the first user, a text fractioner 114 of the trusted third party separates the message into individual pieces 116. By breaking up the contents of the original message into a plurality of pieces, confidentiality of the message as a whole is preserved.

Next, a random relay selector 111 of the trusted third party allocates each of the plurality of pieces to a randomly selected $3^{rd}$ party Mb user accounts 112. Those distributed pieces are then packaged into separate respective messages 118, and published across the microblogging platform. Because communication of message pieces occurs from a microblogging account user who is different from the original Mb publisher (@MbU1), this information sharing takes place in an anonymous manner.

In this particular embodiment, publication of each message fragment over the Mb platform to the ultimate receiver (@MbU2) occurs through a relay of two randomly-selected links comprising a first dummy Mb user and a second dummy Mb user, e.g.:

message fragment A: @MbU1→(dummy)@MbU22→(dummy)@MbU6→@MbU2;

message fragment B: @MbU1→(dummy)@MbU4→(dummy)@MbU19→@MbU2;

message fragment C: @MbU1→(dummy)@MbU17→(dummy)@MbU23→@MbU2.

For each original message published in this manner, the trusted third creates a path digest manager mapping the message fragments and the respective relay paths randomly selected for those fragments. Possession of this path digest manager allows the ultimate message receiver (@MbU2) to access the individual message fragments from the appropriate corresponding relay, and to accurately reconstruct the original message therefrom.

Importantly, the path message digest itself is not communicated from the trusted third party to the ultimate receiver utilizing the Mb platform. Rather, the path message digest is communicated outside the Mb platform, over a separate, secure channel 122. This prevents any unauthorized party from intercepting the path digest with an eye toward reconstructing the original message and learning the identity of the original publisher.

Figure 2:
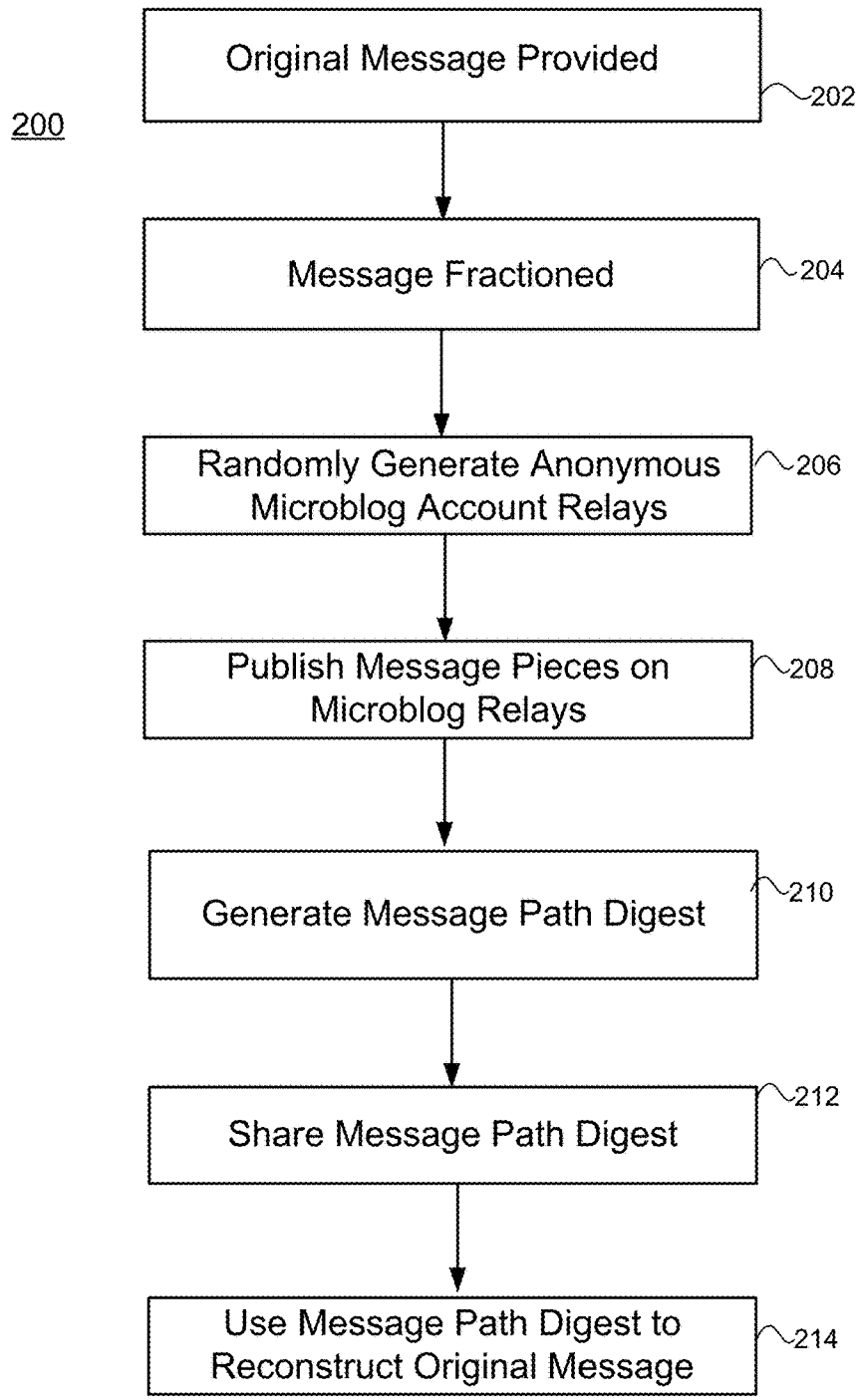
FIG. 2 shows a simplified flow diagram of a method according to an embodiment.

FIG. 2 is a simplified flow diagram showing a method 200 according to an embodiment. At 202, the text of the original message is received by the trusted third party for publication. This original message may be in unencrypted or encrypted form.

At 204, the original message may be fractioned into several pieces. The extent of the fractioning performed (e.g., the number and size of individual message pieces) may be determined based upon factors such as:

the degree of confidentiality desired; and character message length limitation imposed by the microblogging platform.

At 206, a set of anonymous dummy user accounts of the third party are randomly chosen in order to play the role of relays. Those anonymous accounts are a set of non-personal accounts in the microblogging platform that belong to the trusted third party and used to relay confidential information. The number of anonymous relay accounts is high enough to create a cloud of potential relays that is difficult to trace.

At 208, the pieces resulting from fractioning of the original message are published over the microblogging platform utilizing by the randomly selected anonymous relay accounts.

At 210, a list of message identifiers (IDs) generated after this distributed publication, is aggregated and digested by the trusted third party in order to provide a re-identifiable path digest ID.

At 212 receiver(s) of the confidential messages on the microblogging platform are notified by the trusted third party they will receive the path digest (e.g., over a different/ secure communication channel).

At 214, the authorized receiver on the microblogging platform references the path digest to reconstruct the original message from the distributed pieces that were communicated over the relays.

While FIG. 1 depicts a particular embodiment that utilizes individual relays comprising two anonymous dummy user accounts owned by the trusted $3^{rd}$ party, this is not required. Alternative embodiments could employ a different number of accounts within a relay. For example, the simplified example described later below in connection with FIG. 3, utilizes relays comprising a single dummy user account to publish each message fragment.

Conversely, relays comprising more than two relays could also be employed according to various embodiments. Inclusion of each additional dummy account into the relay, would render ever more difficult any attempt by an outsider to re-trace the original publisher in order to penetrate the anonymity.

It is further noted that simple embodiments may not necessarily employ message fractionation at all. Rather, an intact, original message (encrypted or unencrypted) of length permitted by the microblogging platform, could be published in an anonymous fashion utilizing a single relay of third party dummy user account(s) as has been described herein. Such a simplified approach may be implemented when the publisher seeks mere anonymity without also requiring message confidentiality.

EXAMPLE

Figure 3:
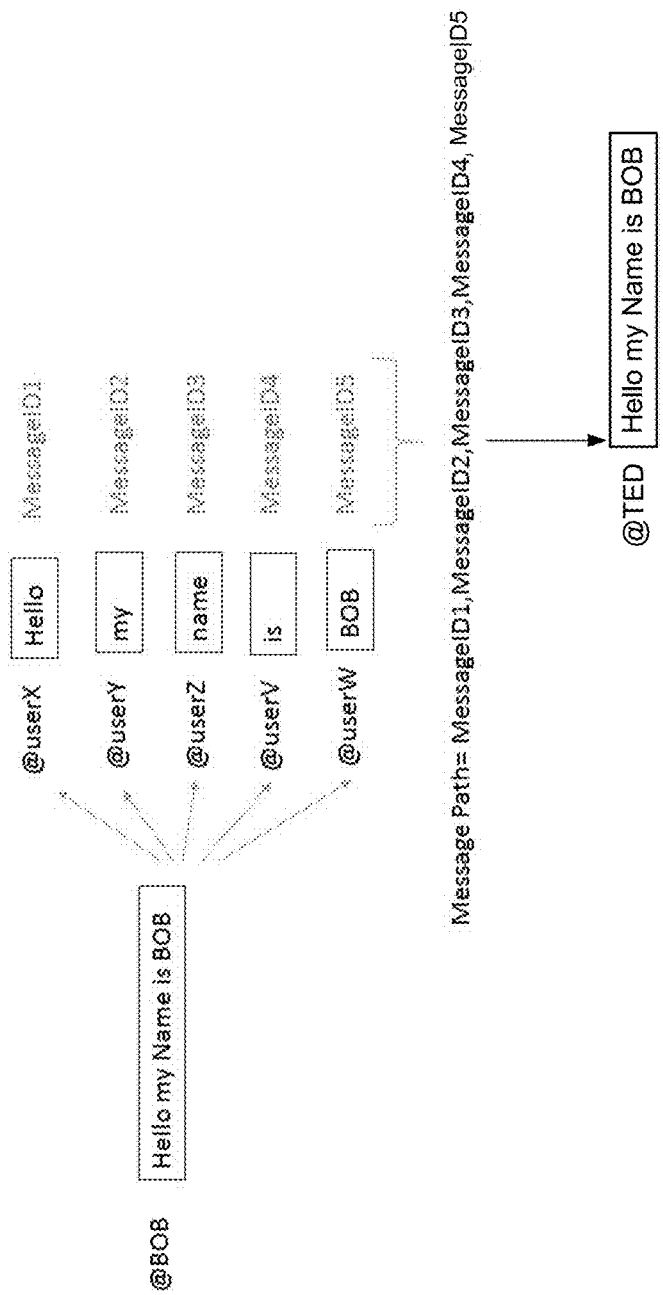
FIG. 3 shows an embodiment of simplified information sharing according to an example.
Figure 4:
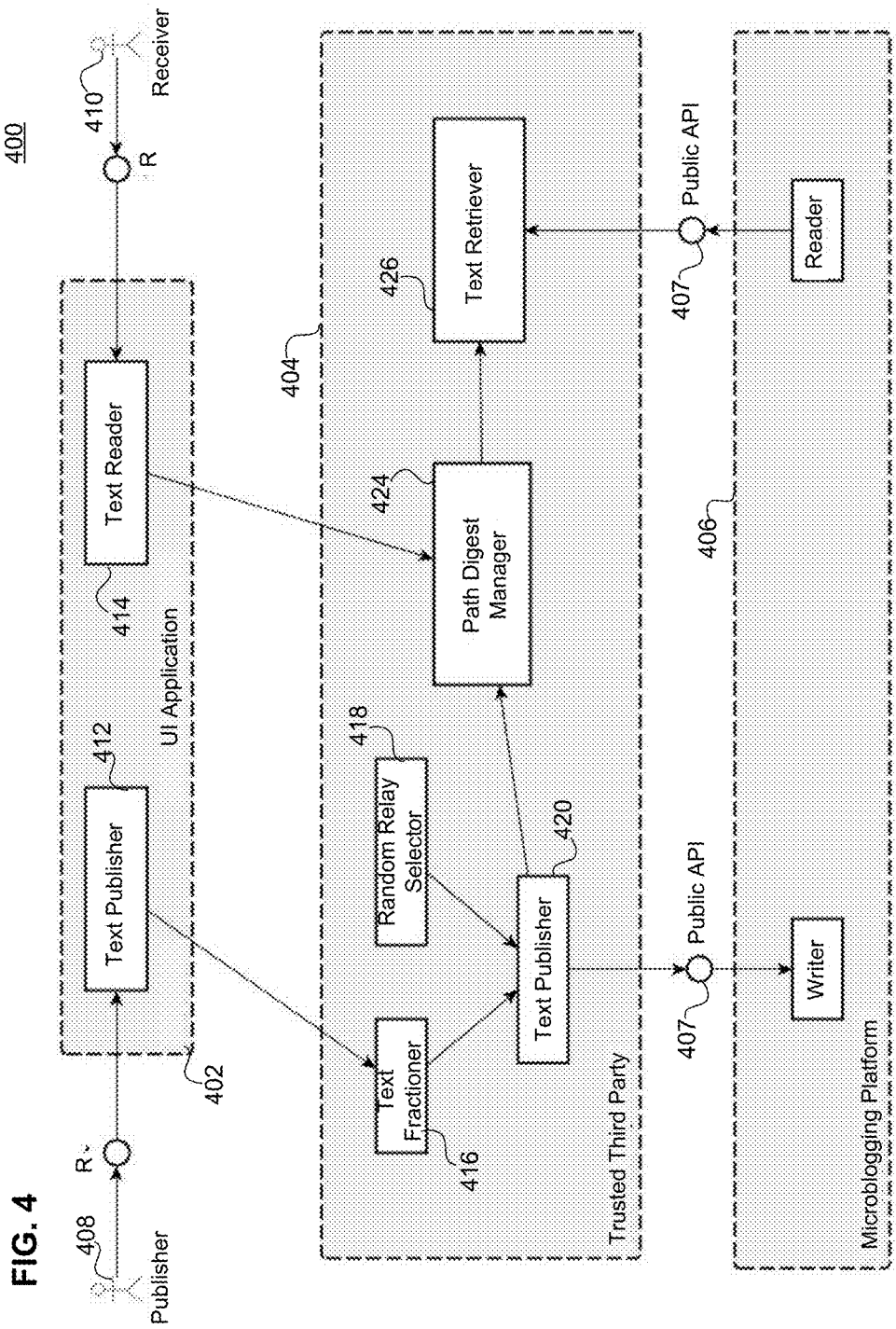
FIG. 4 shows an embodiment of a system architecture for information sharing.

A particular example is now presented in connection with FIGS. 3-4. Specifically, FIG. 3 shows that a user (@BOB) wants to share confidential information with some authorized users (including @TED) using a microblogging platform.

Here, the message is: "Hello my name is BOB". @BOB will access a client application to compose his message and to add recipients (including @TED).

Once @BOB sends this message, the text (in clear) will be fractioned into five separate elements. For example, those elements could be:

"Hello"
"my"
"Name"
"is"
"BOB".

Next, five anonymous accounts belonging to the trusted third party will be selected. Here, those anonymous accounts are @userV-@userZ. Each of the selected accounts will be slated to publish one element (here, a single word) of the original message.

A message path digest is generated in order to allow retrieval of the complete message. This message path is then accessible for the authorized receivers to read the confidential message.

While this particular example shows fractioning of the original message into individual words, this is not required. Other forms of fractionation could be employed, for example including smaller units (e.g., separate characters) or larger units (e.g., word groups).

And, while this specific example shows communication of an unencrypted text message, this is also not required. Alternative embodiments could perform fractionation of an encrypted message, followed by its reconstruction and decryption by an authorized receiver. As discussed further below, particular embodiments could leverage the processing power of an in-memory database engine to perform an encryption function.

FIG. 4 shows a simplified view of a specific architecture of a microblogging confidentiality system according to an embodiment. This architecture 400 comprises a client application layer 402, a trusted third party 404, and a microblogging platform 406.

The microblogging platform layer is used to post anonymously and in a confidential manner, the shared information that is sought to be protected. The microblogging platform offers a public Application Program Interface (API) 407 that is accessible to publish and retrieve messages between a writer and a reader.

The client application layer provides a dialog user interface (UI) with the end user (message publisher 408 and message receiver 410). In some embodiments the client application layer can be decoupled from the trusted third party and/or the microblogging platform. Alternatively, the UI can be part of one of those layers.

Moreover, the client application layer can be deployed as a standalone application running on the user computing device. Alternatively, the client application may be implemented as browser plug-in, or running on a remote server.

A text publisher component 412 of the client UI layer takes as input, the text that is to be anonymized from the publisher. The text reader component 414 takes as input, the path digest from related to the protected message to be accesses by the authorized receiver(s).

The trusted third party layer 404 is in charge of anonymizing the content of the message to be published. It can be deployed on a remote server or partially installed locally on the users computing device.

The text fractioner 416 is in charge of splitting the input message into several pieces in order to be distributed over different postings. The number of pieces can vary according to the confidentiality level that the publisher/user wants to apply.

The trusted third party domain owns several anonymous accounts that are used as relays for the message pieces. The random relay selector 418 is in charge of choosing randomly the relays that will publish the respective pieces of the message.

Once the message is split up and the relays selected, the text publisher 420 of the third party is in charge of calling the public API 407 of the microblogging platform in order to publish the different messages. An authentication process is used for publication through the anonymous accounts of the relays.

The path digest manager component 424 is in charge of creating a path digest from the list of message identifiers (IDs) obtained through the microblogging API after every publication in the relay. This path digest may be in the form of a hash as shown in FIG. 3.

The path digest is used to retrieve the anonymized message. The path digest manager is also in charge of taking a path digest and generating the list of message IDs to be retrieved from the microblogging platform.

The text retriever component 426 of the third party layer takes as input, a list of message IDs to retrieve from the microblogging platform. The text retriever uses the microblogging platform's public API in order to retrieve these messages.

The specific embodiments that are described above are provided for purposes of illustration only, and embodiments are not limited to them. For example, in order to further minimize the possibility of identification and tracking of the anonymous dummy third party accounts, certain embodiments may further operate to inject meaningless filler data that will be randomly published.

In certain embodiments, the trusted third party may be implemented by a database engine, for example as present in an in-memory database. One example of such an in-memory database engine is that of the HANA in-memory database available from SAP SE of Walldorf, Germany.

According to particular embodiments, the processing power available to an in-memory database engine may be leveraged to perform one or more aspects as have been described herein. For example, the in-memory database engine may be employed to analyze the original message in order to determine appropriate or efficient fractionation, a process which may take into consideration per-message character length limitations imposed by the microblogging platform.

According to some embodiments, the in-memory database engine may be leveraged to perform encryption of the original message. This encryption may be performed prior to fractionation, or may be performed upon the message fragments prior to their communication over the microblogging platform utilizing the relays. A cryptography key allowing the ultimate receiver to decrypt the shared information, may be supplied with the digest.

Figure 5:
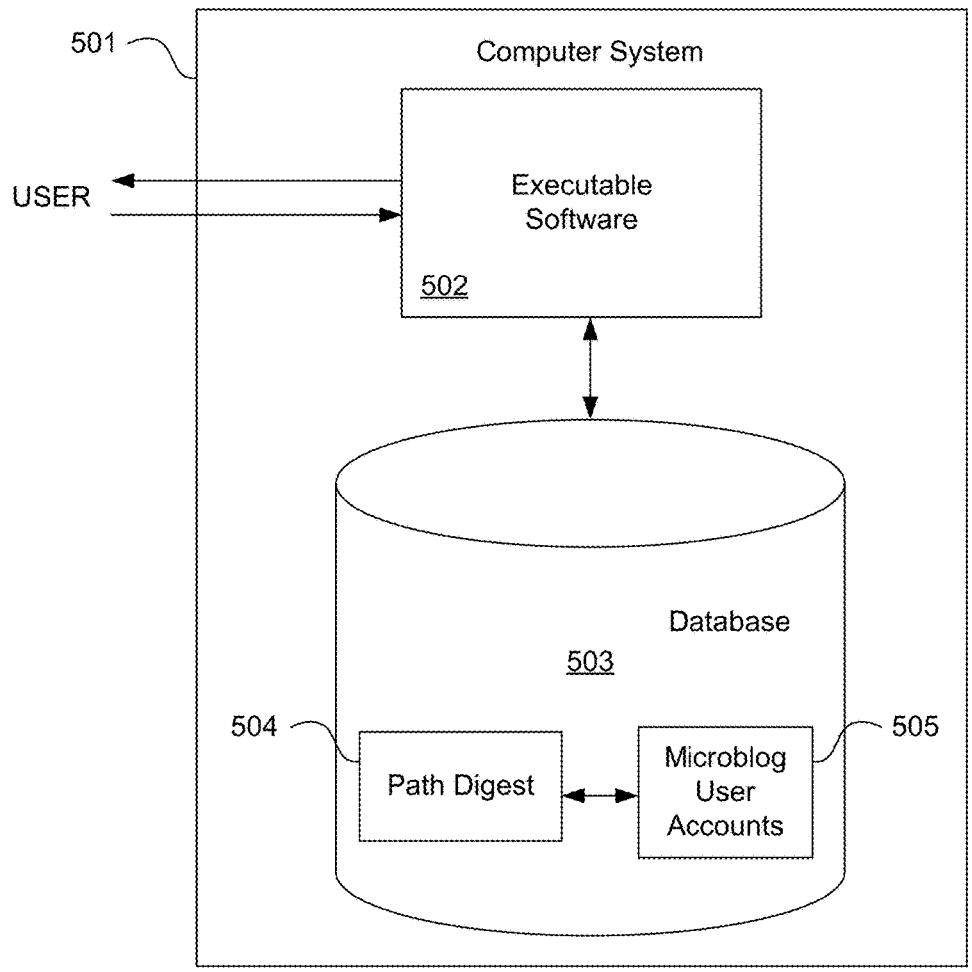
FIG. 5 illustrates hardware of a special purpose computing machine according to an embodiment that is configured to share information from microblogging platforms.

FIG. 5 illustrates hardware of a special purpose computing machine configured to implement microblogging information sharing according to an embodiment. In particular, computer system 501 comprises a processor 502 that is in electronic communication with a non-transitory computer-readable storage medium comprising a database 503. This computer-readable storage medium has stored thereon code 505 corresponding to microblogging user accounts. Code 504 corresponds to a path digest. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
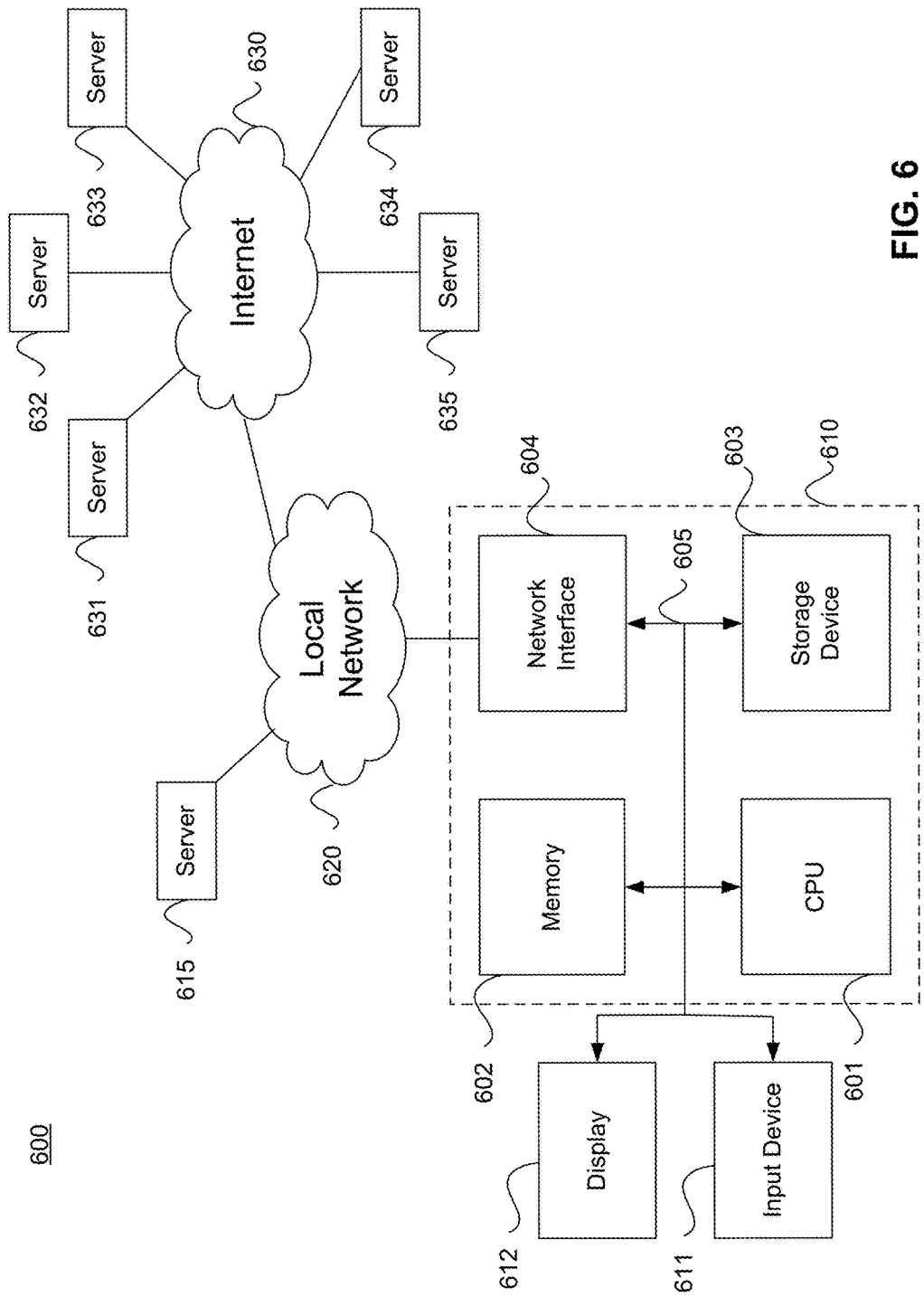
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving from a first user account of a microblogging platform, an original message addressed to a second user account of the microblogging platform
fractioning the original message into a first element and a second element;
randomly selecting a third user account of the microblogging platform;
randomly selecting a fourth user account of the microblogging platform;

publishing the first element of the original message as a first message on the microblogging platform from the third user account to the second user account;

publishing the second element as a second message on the microblogging platform from the fourth user account to the second user account;

communicating outside of the microblogging platform, a digest identifying the third user account, the digest identifying the fourth user account and allowing the receiver to reconstruct the original message with the first element and the second element from the second user account.

2. A method as in claim 1 wherein the fractioning considers a message length limitation of the microblogging platform.

3. A method as in claim 1 further comprising randomly selecting a fifth user account of the microblogging platform, wherein the first element is published to the second user account through the third user account and the fifth user account.

4. A method as in claim 1 further comprising generating a first identifier of the first message, wherein the digest includes the first identifier.

5. A method as in claim 4 further comprising storing the digest in a database.

6. A method as in claim 5 wherein the third user account is randomly selected from a list of user accounts stored in the database.

7. A method as in claim 5 wherein the database comprises an in-memory database.

8. A non-transitory computer readable storage medium embodying a computer program for performing a method, said method comprising:

receiving from a first user account of a microblogging platform, an original message addressed to a second user account of the microblogging platform;

fractioning the original message into a first element and a second element;

randomly selecting a third user account of the microblogging platform;

randomly selecting a fourth user account of the microblogging platform;

publishing the first element of the original message as a first message on the microblogging platform from the third user account to the second user account; and publishing the second element of the original message as a second message on the microblogging platform from the fourth user account to the second user account; and communicating outside of the microblogging platform, a digest identifying the third user account and the fourth user account and allowing a receiver to reconstruct the original message with the first element and the second element from the second user account.

9. A non-transitory computer readable storage medium as in claim 8 wherein the fractioning considers a message length limitation of the microblogging platform.

10. A non-transitory computer readable storage medium as in claim 8 wherein the method further comprises:

randomly selecting a fifth user account of the microblogging platform, wherein the first element is published to the second user account through the third user account and the fifth user account.

11. A non-transitory computer readable storage medium as in claim 8 wherein the method further comprises:

generating a first identifier of the first message; and generating a second identifier of the second message, wherein the digest includes the first identifier and the second identifier.

12. A non-transitory computer readable storage medium as in claim 8 wherein the method further comprises storing the digest in a database.

13. A non-transitory computer readable storage medium as in claim 12 wherein the third user account is randomly selected from a list of user accounts stored in the database.

14. A computer system comprising:

one or more hardware processors;

a software program, executable on said computer system, the software program configured to cause an in-memory database engine to:

receive from a first user account of a microblogging platform, an original message addressed to a second user account of the microblogging platform, the original message comprising a plurality of elements, wherein the first user account and the second user account are stored in the in-memory database;

randomly select from the in-memory database, a third user account of the microblogging platform;

publish a first element of the original message as a first message on the microblogging platform from the third user account to the second user account;

store in the in-memory database, a digest identifying the third user account; and communicate outside of the microblogging platform, the digest allowing a receiver to reconstruct the original message with the first element from the second user account, wherein the software program is further configured to cause the in-memory database engine to:

fraction the original message into the first element and a second element;

randomly select a fourth user account of the microblogging platform from the in-memory database;

store the fourth user account in the digest; and publish the second component as a second message on the microblogging platform from the fourth user account to the second user account, the digest allowing the receiver to reconstruct the original message with the second element from the second user account.

15. A computer system as in claim 14 wherein the software program is further configured to cause the in-memory database engine to:

randomly select a fifth user account of the microblogging platform from the in-memory database, wherein the first element is published to the second user account through the third user account and the fifth user account.

16. A computer system as in claim 14 wherein the software program is further configured to cause the in-memory database engine to:

generate a first identifier of the first message, wherein the digest includes the first identifier.

17. A computer system as in claim 14 wherein the original message is encrypted.

18. A computer system as in claim 14 wherein software program is further configured to cause the in-memory engine database to:

encrypt the first element; and communicate a decryption key outside the microblogging platform to the receiver.

* * * * *